(12) United States Patent
Naito et al.

(10) Patent No.: US 6,219,123 B1
(45) Date of Patent: Apr. 17, 2001

(54) ORIENTATION PROCESS METHOD OF LIQUID CRYSTAL HAVING A FIRST RUBBING DIRECTION FORMED BY FIBERS INCLINED TO THE ROLLING DIRECTION AND A SECOND RUBBING DIRECTION

(75) Inventors: Yoshikatsu Naito, Ishikawa-gun; Hideaki Mochizuki, Kanazawa; Satoshi Yamada, Ishikawa-gun; Hideki Matsukawa, Matsubara, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/233,430

(22) Filed: Jan. 20, 1999

(30) Foreign Application Priority Data

Jan. 20, 1998 (JP) .................................................. 10-008321
Feb. 23, 1998 (JP) .................................................. 10-040757
Mar. 19, 1998 (JP) .................................................. 10-070700

(51) Int. Cl.[7] ................................................. G02F 1/1337
(52) U.S. Cl. ............................................................. 349/126
(58) Field of Search ................................ 349/126; 492/29

(56) References Cited

U.S. PATENT DOCUMENTS 5,398,127    3/1995   Kubota et al. .
5,568,296   10/1996   Kodera et al. .

FOREIGN PATENT DOCUMENTS 64-44416     2/1989   (JP) .
2-22624      1/1990   (JP) .
5-45654      2/1993   (JP) .
3032820     10/1996   (JP) .
9-73087      3/1997   (JP) .
10-123524    5/1998   (JP) .

Primary Examiner—Walter J. Malinowski
(74) Attorney, Agent, or Firm—Parkhurst & Wendel, L.L.P.

(57) ABSTRACT

A rubbing buff is wrapped around a roller so that an axial direction of short fibers on a rubbing cloth crosses diagonally with a roller rolling direction. The roller is placed so that a rotational shaft crosses diagonally with a moving direction of a substrate. Then orientation films formed on an upper and a lower substrates are rubbed by the roller in a first and second directions whereby an orientation direction is determined. As a result, quality display can be realized on an LCD.

9 Claims, 12 Drawing Sheets

24

ROLLING DIRECTION

ORIENTATION PROCESS METHOD OF LIQUID CRYSTAL HAVING A FIRST RUBBING DIRECTION FORMED BY FIBERS INCLINED TO THE ROLLING DIRECTION AND A SECOND RUBBING DIRECTION

FIELD OF THE INVENTION

The present invention relates to a rubbing method, which can eliminate striped mottles appearing in half-tone display or near at a threshold voltage, hereby realizing quality display, and the present invention also relates to a liquid crystal display (LCD) processed by this method.

BACKGROUND OF THE INVENTION

It is a general tendency of the recent LCD market that a display capacity (a number of pixels) is increased in step with enlarging a screen size. To obtain a uniform display quality all over a large screen, how to process an orientation is a critical factor. An LCD has been oriented through rubbing a surface of polyimide orientation film with a rubbing buff. This film is made from thermesetting polyamic acid, and the rubbing buff is made of a cloth on which short fibers are transplanted. This orientation method requires simple process, a little time and reasonable cost.

This method, however, entails scrapes on the orientation film due to mechanical contacts between the rubbing-buff-tips and surface of the film. Strength of these mechanical contacts and a degree of scraping are greater at level differences on a substrate than other places, and particularly greater at edge portions thereon. The scrapes remaining on the surface sometimes produce some influence.

The striped mottles produced by an orientation and appearing on a color filter surface of a substrate, in particular, have not been eliminated although a rubbing condition has been changed. One example of the condition changes is that the buffing face is pressed vertically to the orientation film surface so that rubbing density can increase.

Striped mottles appearing on a moving direction can be illustrated in FIG. 7 in which a thin disc represents a rubbing roller because the thin disc contacts a substrate surface at only one point for making a description simple. Thin disc 21 contacts substrate 7 atone point and rolls on shaft 19b of rubbing roller 19 in the direction indicated by arrow mark "b". Solid line 20 showing a moving direction (arrow mark "a") of glass substrate 7 and another solid line 20a showing a rotary direction projected on the surface of glass substrate produce an angle θ. A prior art disclosed in the Japanese Patent Application Unexamined Publication No. H02-22624 teaches that the angle θ is adjusted within the range of ±1°–45° so that the striped mottles can be eliminated.

The orientation process discussed above, however, is easily affected by the level differences on the surface of substrate because the thin disc contacts the surface at only one point. In the present market trend of increasing a display capacity, in particular, a transparent-conductive-film (ITO= indium-tin-oxide) is thickened in order to lower a resistance of ITO for overcoming cross-talk and variation of threshold values due to attenuation by an electrode. When an electrode pattern is formed on such a thickened ITO, grooves having level differences of several thousand angstroms appear linearly aligned. In the prior art where the thin disc having only one contact point with the film, the conventional rubbing buff of which fiber direction is the same as a rolling direction of the rubbing roller produces striped mottles due to these grooves.

The grooves produce influence at every rotation of the rubbing roller, and the influence is effected in series because of continuous rolling, whereby the striped mottles can be recognized while the LCD is operated. The mottles thus produced on LCD 24 are shown in FIGS. 11. There are various types of mottles relative to places and widths such as "a1" parallel with a moving direction of the substrate, or wider (belt-like) mottles "a2".

SUMMARY OF THE INVENTION

The present invention aims to provide an LCD orientation method that eliminates striped mottles to realize quality display and an LCD that is processed by the same method. The striped mottles are observed when the LCD is operated in half-tone display and also at around the threshold voltage.

The orientation method of the present invention is performed in the following order.
(a) Prepare orientation films both on an upper and a lower substrate of LCD.
(b) Prepare a cylindrical rubbing roller around which a rubbing buff having short fibers transplanted thereon is wrapped.
(c) Rub the orientation film by rolling this roller such that a shaft of the roller diagonally crosses with the moving direction of the substrate. The rubbing buff is affixed on the roller such that the fiber axial direction crosses diagonally with the roller rolling direction.
(d) A first rubbing is conducted within a crossing angle produced by the respective normal orientations of the upper and lower substrates, and in the direction within 5–30° with regard to the direction of normal orientation.
(e) A second rubbing determining the orientation direction is conducted. The method discussed above can prevent the striped mottles from appearing, and thereby obtaining quality display all over the LCD.

The fiber axial direction of the rubbing buff with regard to a rotary direction of the rubbing roller produces an angle α. Then, the angle α satisfies the following relation so that the striped mottles appear discontinuously and are not recognized:

$$D < (60 \times S/N) \tan \alpha$$

where: N=rotating speed of the roller (rpm),
S=moving speed of a stage (mm/sec)
D=width of ITO electrode (mm)
Preferably, the orientation film is made of polyimide system material and has a pretilt angle of 3° or more.

DETAILED DESCRIPTION OF THE INVENTION

Figure 1:
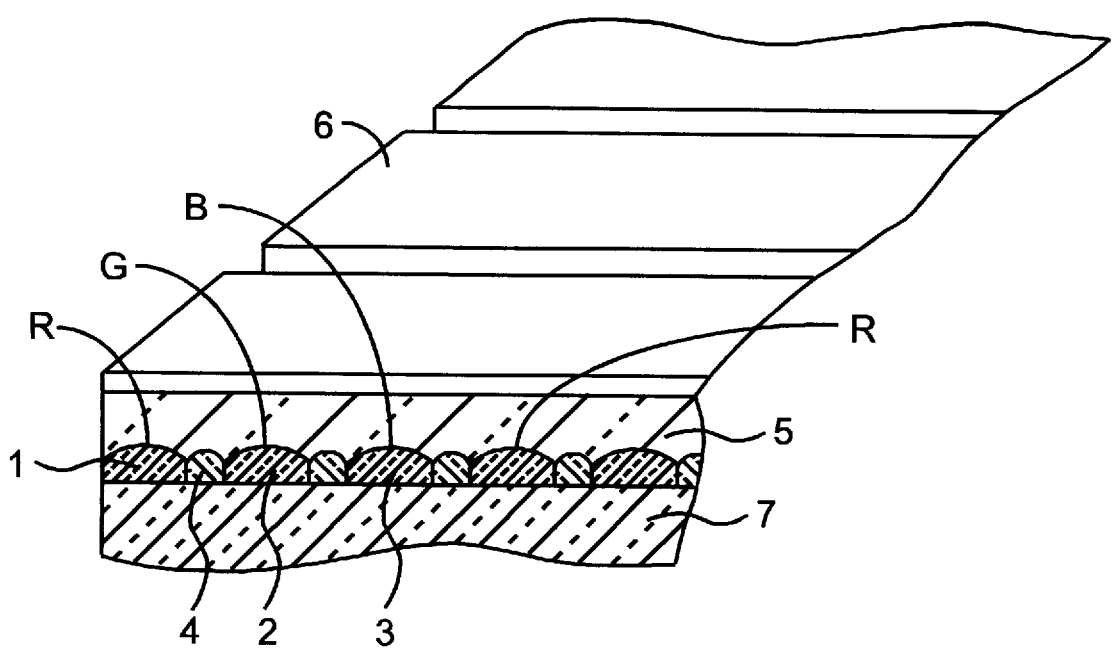
FIG. 1 is a schematic view of a substrate of color filter side, where an ITO electrode pattern has been formed.
Figure 2:
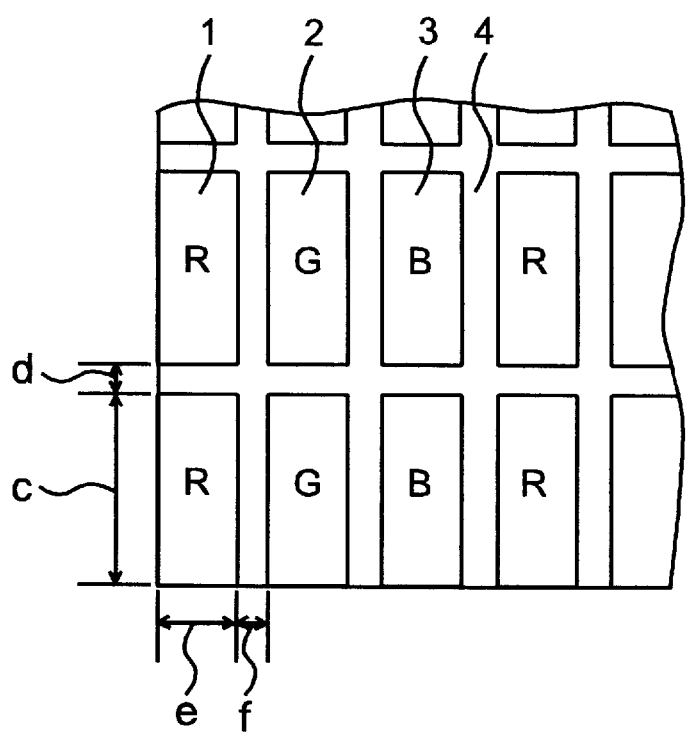
FIG. 2 is a plan view depicting an array of color filter.

Exemplary embodiments of the present invention are described hereinafter with reference to the accompanying drawings. FIG. 1 is a schematic view of a substrate of color filter side, where an ITO electrode pattern is formed. FIG. 2 is a plan view depicting an array of color filters. As an example, a construction of color filters employing a printing method is described hereinafter.

On lower glass substrate 7, color filters 1, 2 and 3 representing red (R), green (G) and blue (B) are formed in rectangles. Black matrixes 4 are formed between respective color filters. Smoothing layers 5 are formed on each color filter and black matrix. Further on smoothing layer, ITO electrode 6, made of indium-tin-oxide thin film electrode, is formed. The film thickness of electrode 6 is set at not more than 5 $\Omega/\square$. ITO electrode 6 is patterned at right angles with rectangular color filters. The electrode-line-width of pixel is 280 $\mu$m (dimension "c" in FIG. 2), and a space between the electrodes is 20 $\mu$m (dimension "d" in FIG. 2).

Figure 3:
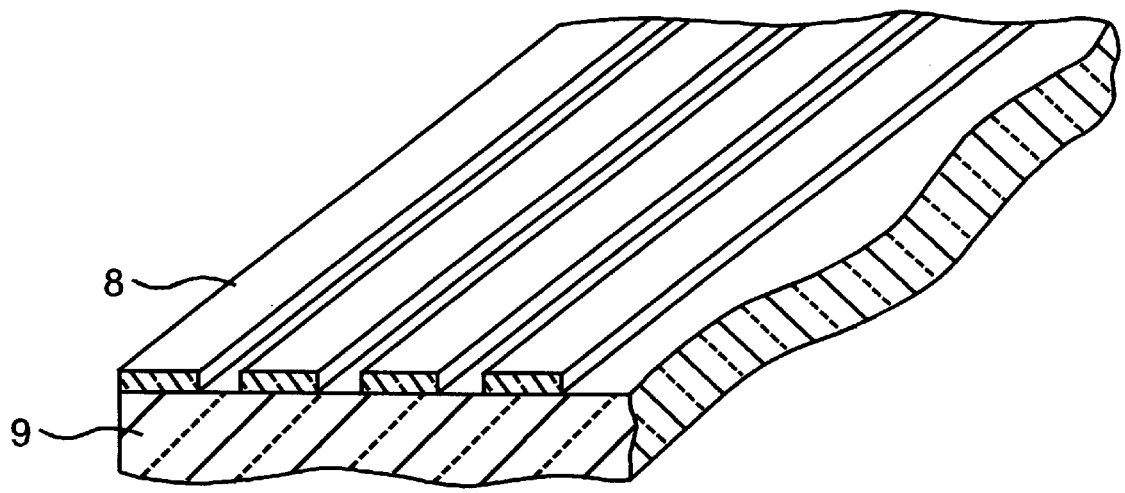
FIG. 3 is a schematic view of a substrate opposite to the color filter, where an ITO electrode pattern has been formed.

FIG. 3 is a schematic view of a substrate opposite to the color filter, where an ITO electrode pattern is formed. On upper glass substrate 9, ITO electrode 8 is formed so that the film thickness thereof produces 10 $\Omega/\square$ or less. When lower glass substrate 7 is opposite to the film face of ITO, the electrodes are patterned to be parallel with the rectangular filter of respective colors. The electrode-line-width of pixel is 80 $\mu$m (dimension "e" in FIG. 2), and a space between the electrodes is 20 $\mu$m (dimension "f" in FIG. 2).

Figure 4:
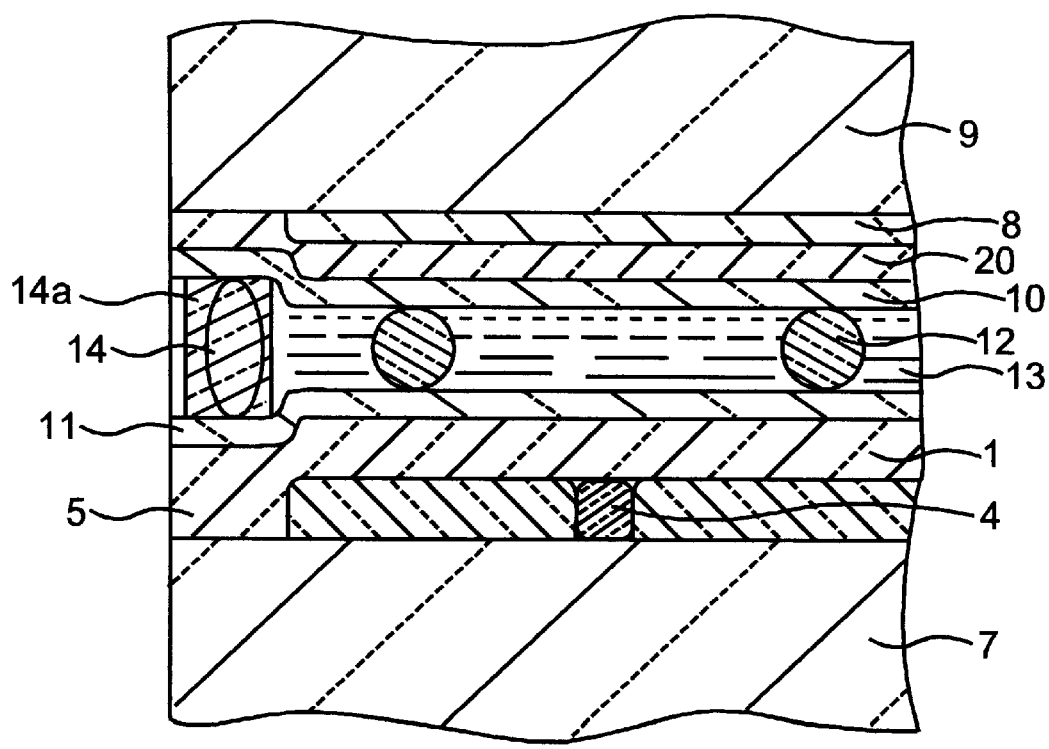
FIG. 4 is a cross section depicting a vacant panel where liquid crystal material is injected.

FIG. 4 is a cross section of a completed LCD panel where liquid crystal material has been injected between the upper and lower substrates. Orientation films 10 and 11 are formed on upper and lower glass substrates 9 and 7. In FIG. 4, a spacer, liquid crystal material, sealing resin and bead are indicated by numerals 12, 13, 14a and 14 respectively.

Figure 5A:
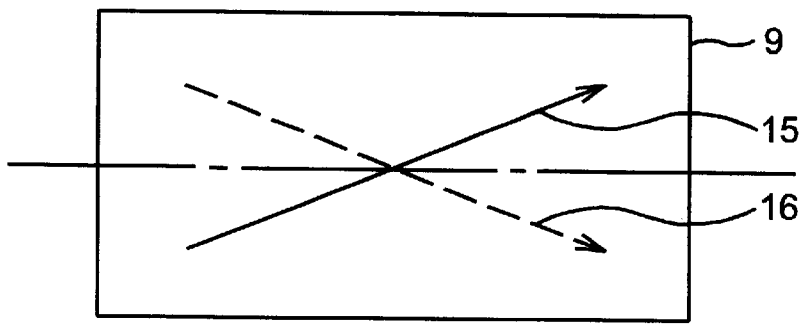
FIGS. 5(a) and 5(b) are schematic view of a first and a second rubbing directions respectively.
Figure 5B:
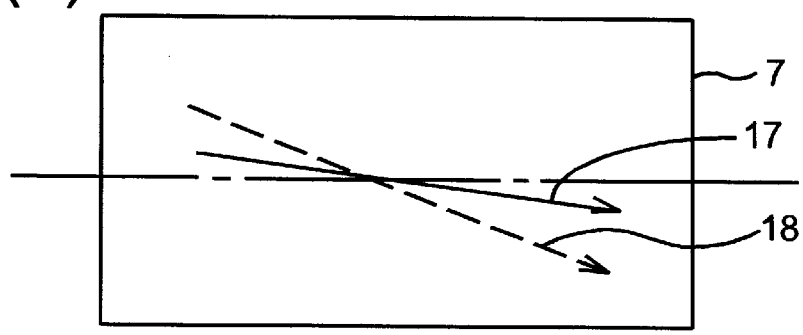

FIGS. 5(a) and 5(b) depict orientation processes provided to the upper and lower glass substrates. FIG. 5(a) shows a state of the substrate being laid on another substrate so that each orientation surface faces to each other, after each glass substrate is rubbed in the direction of the normal orientation. The state in FIG. 5(a) is viewed from upper glass substrate 9. Direction 15 shows a normal orientation direction of the upper glass substrate, and direction 16 shows a normal orientation direction of the lower glass substrate.

Before substrates 9 and 7 are rubbed in the respective directions of normal orientation, a first rubbing is provided as a pre-process to the substrates within an angle ranging from 5° to 30° with regard to the direction of normal orientation. This pre-process secures a twist direction of liquid crystal molecule to be more stable and also weakens regulating force of orientation. FIG. 5(b) shows an orientation direction of lower glass substrate 7 viewed from the orientation-processed face. The first rubbing is directed along arrow mark 17, and the normal orientation is directed along arrow mark 18. The angle of the first rubbing with regard to the direction of normal orientation is set to be within the crossing angle of respective rubbing directions of substrates 9 and 7 viewed from one of the substrate when the two substrates are combined. After the first rubbing, the normal orientation is provided to determine the orientation direction. The rubbing is performed under the following condition.

(a) rotating speed of the roller=N (rpm): 1000 rpm
(b) stage moving speed=S (mm/sec): 45 mm/sec
(c) angle $\alpha$ between the axial direction of buff fiber and the roller rotating direction (refer to FIG. 8): 7°
(d) buff: Model No. YA-20R made by Furukawa Process Inc.
(e) depressed distance: 0.35 mm The depressed distance is measured by the following method.

The buff (rubbing cloth) is affixed on the roller with double-faced tape, and the roller shaft is depressed onto the substrate. Then a shifted distance is measured. The reference point is the contact point of a tip of short fiber pile on the rubbing cloth and the substrate.

Figure 6:
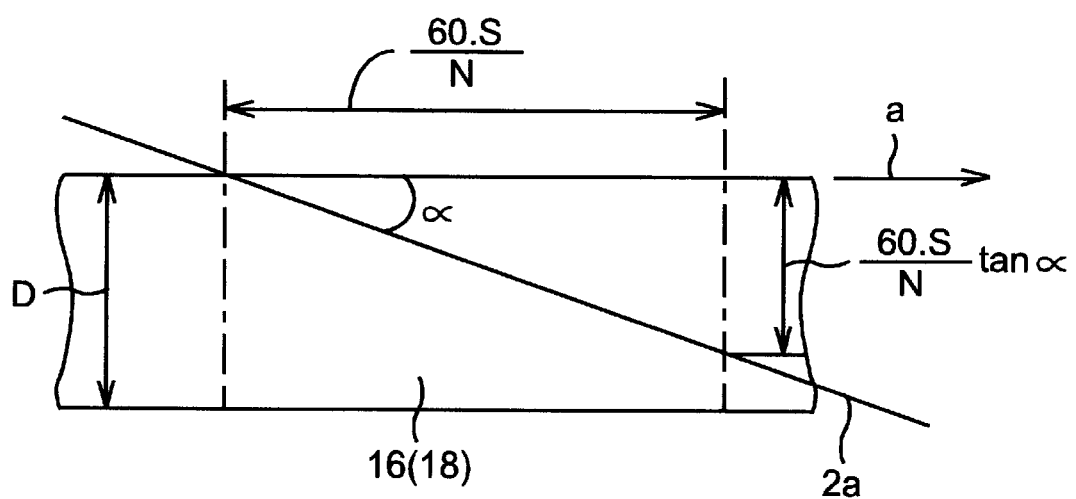
FIG. 6 is a schematic view depicting a mechanism how striped mottles are produced and the eliminating conditions thereof.
Figure 7:
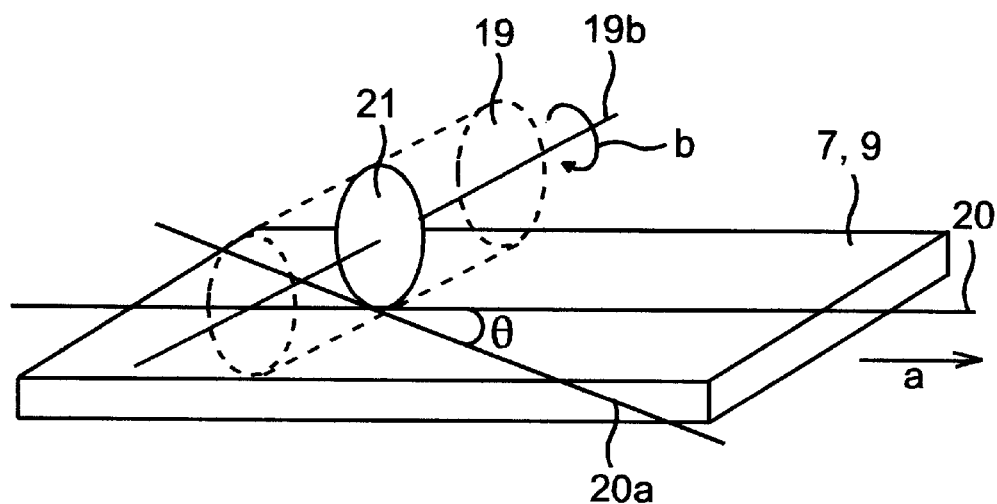
FIG. 7 illustrates a disc representing a rubbing roller, with which a mechanism of producing the striped mottles is depicted.

FIG. 6 illustrates the relation between the rubbing conditions described above and the width D of ITO electrode (mm). In order to understand this relation, the thin disc shown in FIG. 7 is used. One rotation of the rubbing roller travels on the substrate by the distance of 60×S/N. Therefore, in order to stride over the width "D" of ITO electrode by one rotation of the rubbing roller, i.e. whereby the striped mottles become discontinuous, the following relation should be realized.

$$D<(60\times S/N)\tan\alpha$$

In the following exemplary embodiments, "D" (mm) takes 0.28 mm on lower glass substrate 7 and 0.08 mm on upper glass substrate 9, and the right side of the foregoing relation is figured out according to the conditions to be (60×S/N) tan 7°=0.33 mm. The relation is thus satisfied, and one rotation of the rubbing roller can stride over the width of ITO electrode. As a result, the striped mottles become discontinuous and are not recognized.

Figure 8:
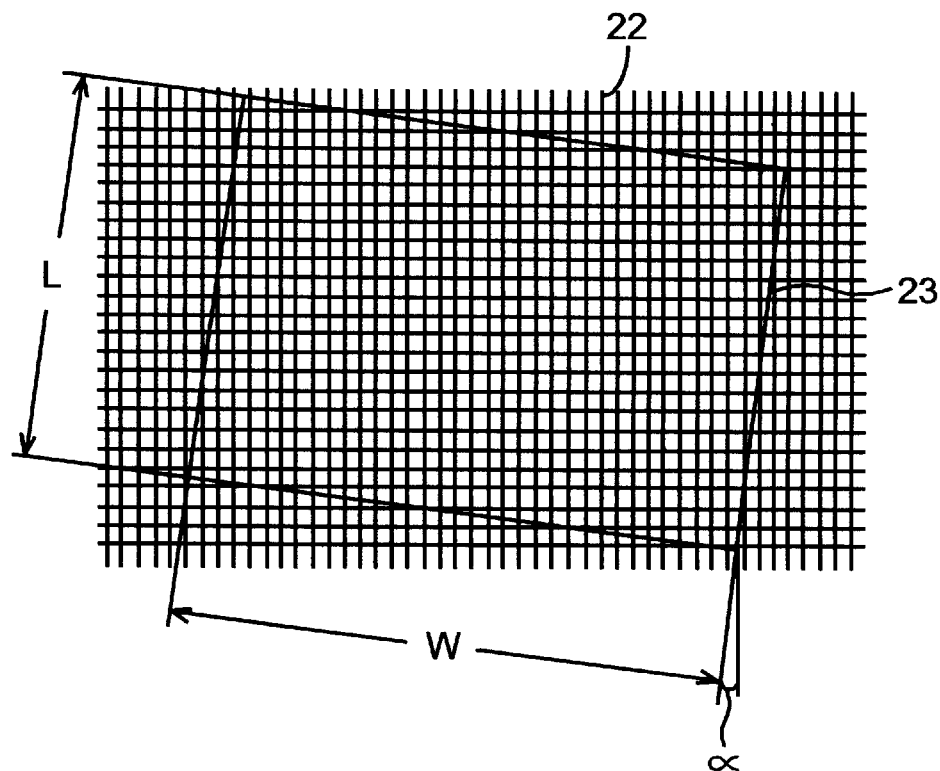
FIG. 8 shows how to cut out a rubbing cloth used in the rubbing process of the present invention.

The rubbing buff used in the exemplary embodiments has been cut out at an angle $\alpha$ that is produced by the warp direction of the rubbing cloth and the rolling direction of the roller, which is illustrated in FIG. 8. The angle $\alpha$ ranges preferably from 5° to 30°. When the rolling direction of the roller is the same as an alignment direction of the short fiber piles, the contact points of each pile to the substrate are overlapped, which contributes to uneven rubbing and results in striped mottles. However, if the two directions mentioned above cross diagonally, the contact points disperse, which contributes to a uniform rubbing. Cut out the raw cloth 22 of the rubbing buff at the angle $\alpha$, and wind the rubbing cloth 23 on the roller so that L direction is parallel with an end face of the roller. Then affix the cloth 23 on the roller.

Figure 12:
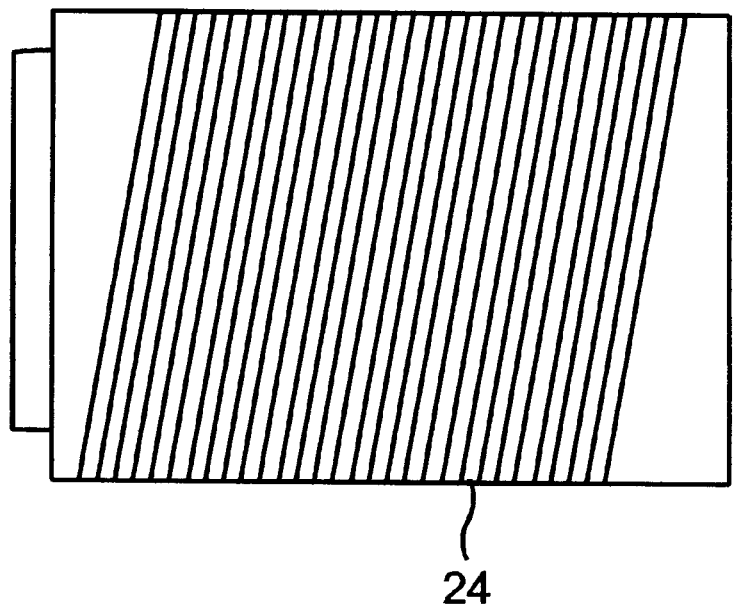
FIG. 12 shows striped mottles (brightness mottles) appearing on the LCD produced by a conventional rubbing method.

Rubbing roller 19 is desirably free from looseness produced by the force directed to rolling direction and also free from worn-out of adhesion of rubbing buff 6. The looseness of rubbing buff 6 contributes to uneven brightness. appearing parallel with a rotary shaft during the LCD operation as shown in FIG. 12. Therefore, the rubbing buff 6 has preferably a less stretch rate in the rolling direction. To be more specific, when a tensile stress of 1 kg/cm directed to the rolling direction is applied to the buff 6, the stretch rate is preferably 10% or less. The stretch rate of rubbing buff 6 largely depends on a kind of cloth; however, it also depends on the cut-out angle i.e. the cut-out angle $\alpha=0$ makes the stretch rate minimum, and the cut-out angle $\alpha=45°$ makes the rate maximum.

Figure 10:
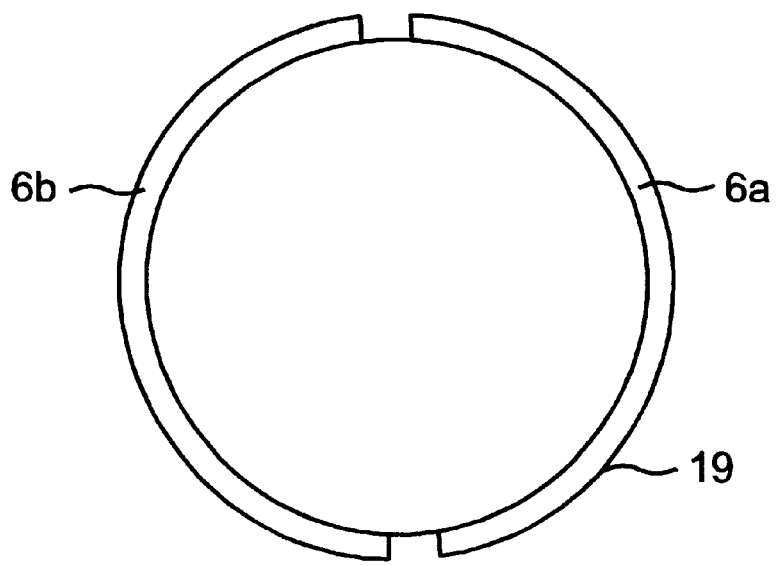
FIG. 10 is a cross section depicting an exemplary embodiment of a rubbing roller of the present invention.

When a plurality of rubbing buffs (6a, 6b) as shown in FIG. 10 are affixed on roller 19, the looseness can be avoided. Rubbing buffs 6a and 6b are shortened relative to the rolling direction, and are wound with equal spaces on the roller.

FIG. 10 illustrates an example of the roller divided into two sections, and the roller is preferably divided into two to four sections.

When the roller rolls in the same direction as the substrate moves, pile tips are vulnerable to being split, which contributes to uneven rubbing. These two directions are thus crossed at an angle $\theta$ to avoid this problem.

Figure 9:
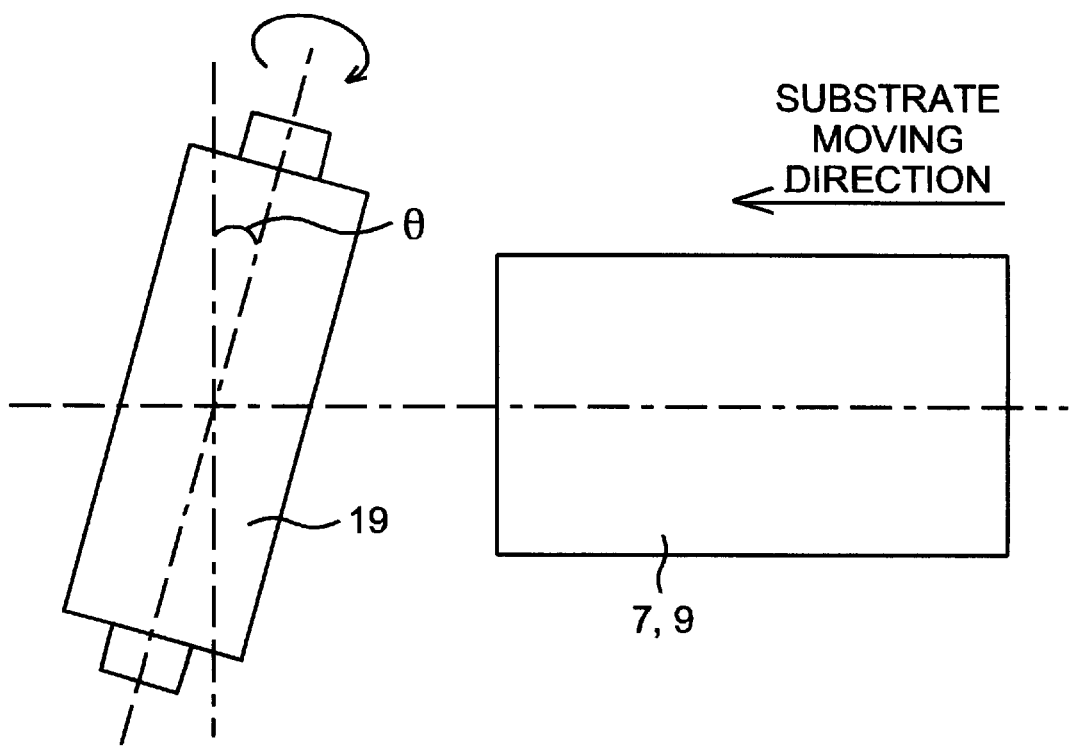
FIG. 9 illustrates a relation between a substrate and a rubbing roller in the rubbing process of the present invention.

A vertical direction with regard to the moving direction of substrate crosses with the rotary shaft at an angle $\theta$ shown in FIG. 9. This angle $\theta$ ranges preferably between 20–45° to reduce the mottles due to the looseness of rubbing cloth. The substrate can be placed free from any specific restrictions; however, the substrate can be preferably placed so that one side of rectangle is parallel with the moving direction. This placement can reduce mottles that are produced when a corner of substrate touches the roller. The rotating speed of the roller ranges desirably from 600 to 1200 rpm when the roller diameter is 150 mm, and the moving speed of the substrate ranges desirably from 20 to 80 mm/sec.

The rubbing is preferably performed under the following condition:

The minimum distance between the root of pile and the substrate surface is smaller than P cos β by 0.2–0.7 mm.

where P=pile length, and β=tilt angle of the pile (degree)
The pile length "P" is preferably between 1.7–2.0 mm. These conditions allow the rubbing process to minimize the looseness of rubbing cloth as well as damages to the orientation film surface. This rubbing process produces closer contacts of filaments to the substrate surface than the case where only pile tips contact the surface. As a result, more uniform rubbing is realized. Plural numbers of rubbing to the same substrate are preferable, and two or three times of rubbing are desirably performed to the same substrate.

FIG. 4 illustrates how to affix the upper and lower glass substrates to each other. On lower substrate 7, plastic beads 12 in substantial quantity are sprayed in order to secure a necessary depth of clearance. Outside the pixels of ITO electrode 8 of oriented surface on upper substrate 9, a line having a given width and made of thermosetting resin mixed with glass-fiber-made spacers in one wt. % is screen printed. After these processes, lower substrate 7 and upper substrate 9 are affixed to each other so that both the surfaces undergone the orientation process face inside. Then the affixed substrates are vacuum packed with a heat-proof film. Finally, thermosetting process is provided under a given condition.

A vacant panel is thus fabricated. Liquid crystal material 13 of STN type is injected into the vacant panel, thereby completing the panel. Mixed liquid crystal material unified to an alkenyl system composition is used as liquid crystal material 13. This mixed material has a phase-transition temperature of 90° C. or more between an isotropic phase and a liquid crystal phase. Another mixed liquid crystal material unified to alkyl system composition can be used as liquid crystal material 13. Table 1 shows comparison result between the cases of the present invention and the cases for comparison. Each sample is evaluated in 1 kHz rectangular wave form and in actual operation with an APT driving module.

TABLE 1

| | Rubbing buff angle | Orientation film pretilt angle | Liquid crystal material anisotropy of dielectric constant | Turn-on condition | |
|---|---|---|---|---|---|
| | | | | Rectangular wave | Actual driving |
| Comparison case 1 | 0° | 3° | 7 | X | X |
| Comparison case 2 | | | 12 | X | X |
| Comparison case 3 | | 7° | 7 | | Δ |
| Comparison case 4 | | | 12 | Δ | X |
| Case 1 of the present invention | 7° | 3° | 5 | ⊚ | ⊚ |
| Case 2 of the present invention | | | 7 | | |
| Case 3 of the present invention | | | 12 | | Δ |
| Case 4 of the present invention | | 7° | 7 | ⊚ | ⊚ |
| Case 5 of the present invention | | | 12 | | |

In the table 1, densities of the striped mottles are classified into the following four classes.
⊚: no striped mottles
○: several pale striped mottles
Δ: several striped mottles
X: more than several striped mottles When the panels are turned on, among the comparison cases 1–4 where the rubbing buff angle is set at 0°, only the case 3, where a pretilt angle is 7° and an anisotropy of dielectric constant of the liquid crystal material is 7, shows a recognizable several pale striped mottles. However, under the actual operation, the comparison cases 1–4 show several striped mottles or more, and thus they have no practical use.

On the other hand, among cases 1–5 of the present invention where the rubbing buff angle is set at 7°, only the case 3 shows several pale striped mottles. The case 3 has the pretilt angle set at 3° and the anisotropy of dielectric constant of the liquid crystal material set at 12. All the cases 1–5 of the present invention thus have quality displays for practical uses. The cases 1 and 4, among others, show displays of not only free from striped mottles but also of excellent display quality.

(Measuring the stretch rate of the rubbing cloth)

Figure 13:
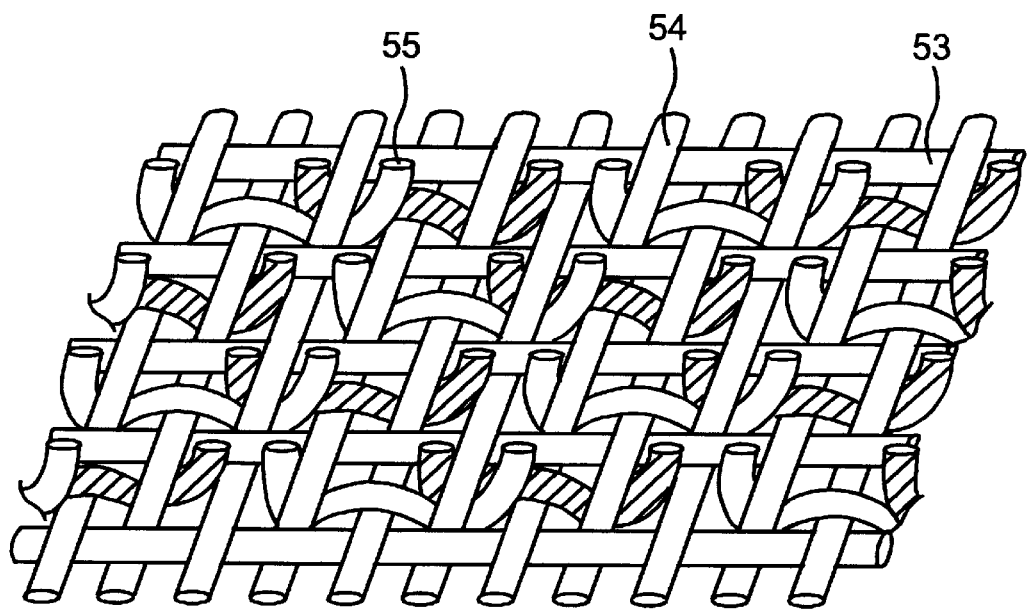
FIG. 13 is a schematic view of a rubbing cloth.
Figure 14:
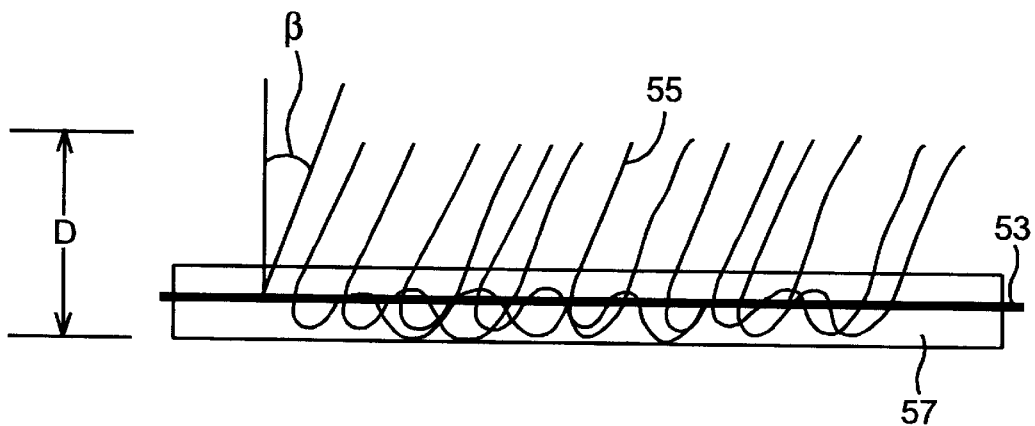
FIG. 14 is a cross section of a rubbing cloth used in an exemplary embodiment of the present invention.

A raw cloth having a structure shown in FIG. 13 or FIG. 14 is used for a rubbing cloth. The warp 53 and woof 54 are made of "cupra rayon" manufactured by Asahi Chemical Inc. The pile 55 is made of the fiber having 120 denier of pile diameter, which comprises viscose rayon having 3 denier of filament diameter made by Kurale Inc. On the rear face (where no pile tips appear) of the rubbing cloth, polyvinyl acetate resin 57 is applied in order to prevent the piles from being lost as well as the cloth from being deformed. The overall thickness of the rubbing cloth D=1.8 mm, an average pile length P=1.8 mm, and an average pile tilt angle β=15°.

In order to measure the stretch rate of the rubbing cloth, the raw cloth is cut out into 6 slips each having the dimension of 5 cm wide and 30 cm long so that the angle α shown in FIG. 8 can be 0°, 3°, 10°, 15°, 30° and 45°. Tensile stress of 5 kg is applied to each slip in the longitudinal direction, i.e. tensile stress of 1 kg/cm is applied to a unit width. The stretch rate measured under this condition is shown in table 2. The stretch rate "S" (%) is defined as:

$$S = (L1 - L0) / L0 \times 100,$$

where L0=original length,
L1=length with the tensile stress.

TABLE 2

| Cut-out angle α(°) | Stretch rate (%) |
| --- | --- |
| 0 | 1 |
| 3 | 1.20 |
| 10 | 3.30 |
| 15 | 5.80 |
| 25 | 11.70 |
| 45 | 17.50 |

Table 2 tells that the stretch rate increases at the greater angle α. This is because the buff is affixed to the roller with a double-faced tape i.e. the maximum stress applied to the buff is parallel to the roller rotating direction. When the buff fibers direct mainly to the same direction i.e. the angle α=0°, the cloth is hardly deformed; however, if the angle α increases, the cloth is deformed by rubbing stress.

(Exemplary Embodiment 1)

The same cloth used in the forgoing measurement is cut out to a rectangle having an identical length to the rim length of the roller. The rectangular cloth is wrapped around the roller as a rubbing cloth with a double-faced tape so that the longitudinal direction ("L" of FIG. 8) of the cloth is parallel with an end face of the roller. This rubbing roller is placed so that the rotary shaft is tilted with regard to an orthogonal direction to a moving direction of the substrate. Then, the substrate undergoes a rubbing process.

Figure 16:
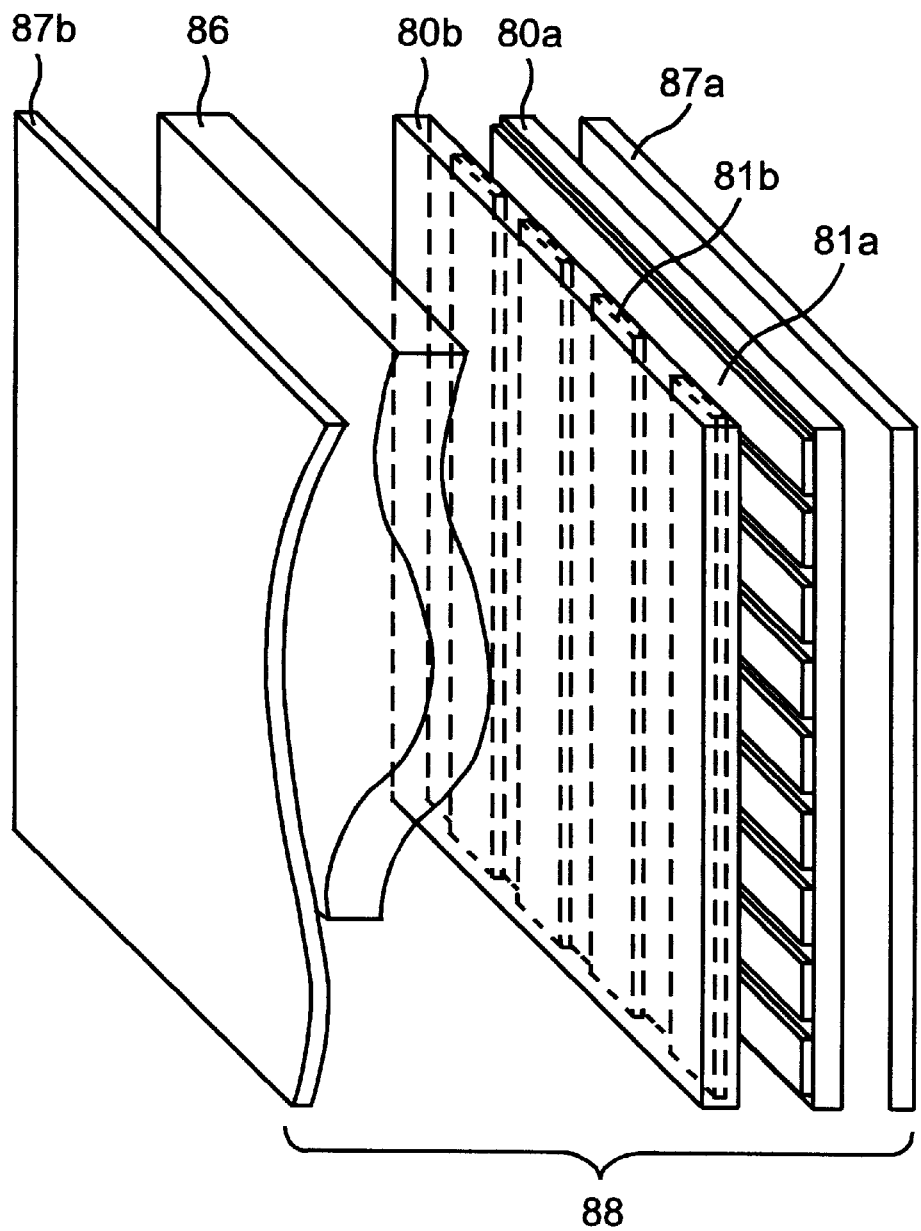
FIG. 16 is a bird's-eye view of an LCD.
Figure 17:
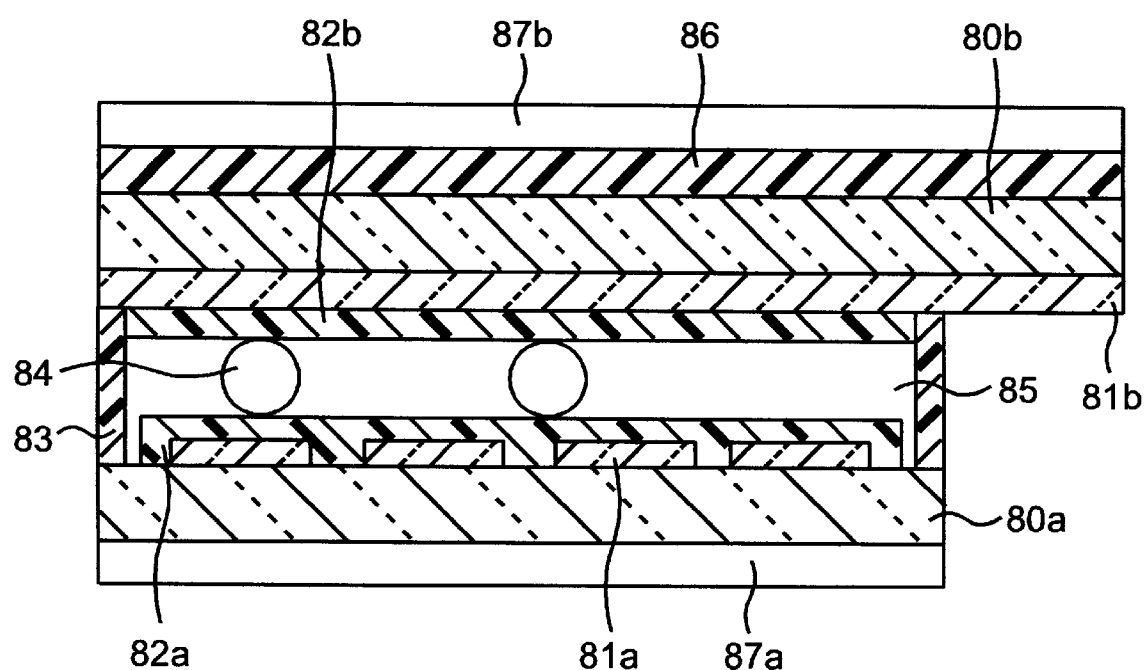
FIG. 17 is a cross section of the LCD.

On the substrate as shown in FIG. 16 and FIG. 17, transparent electrodes 81a and 81b have been formed, and further, polyimide-prepolymer 82a and 82b (PSI2204 made by Chisso Petrochemical Inc.) have been applied thereon and cured, whereby orientation film has been formed. The roller is tilted with regard to a first transparent substrate 80a and a second transparent substrate 80b at 10°, 60° respectively. Orientation twist angle between the upper and lower substrates takes 250° when liquid crystal cell is produced. The rubbing roller having a 150 mm diameter is employed and rotates at a 900 rpm rotational speed. The substrate moves at a 40 mm/sec speed. Spacers are sprayed (200 pcs./mm) on both the upper and lower substrates undergone the rubbing process, then sealing material is applied to edges of both the substrates, and the substrates are affixed to each other, whereby a liquid crystal cell is completed. Spacer 84 is made of a micro-pearl having a 6.1 μm diameter, which is manufactured by Sekisui Fine Inc. The thickness of liquid crystal layer is 6 μm. Liquid crystal is injectced through an inlet formed on part of seal 83 by vacuum injection method. Liquid crystal material comprises a composition having an anisotropy refractive index (Δn)=0.15 mixed with a little amount of chiral component. The inlet is sealed with resin cured by ultraviolet rays, then polarizing plates 87a and 87b as well as phase difference plate 86 are affixed to both the substrates. As a result, the LCD as shown in FIG. 17 is acquired.

In the foregoing manufacturing process, the following 30 samples listed in table 3 are tested. These samples have different cut-out angles of raw cloth (angle α in FIG. 8) and the depressed distances. The depressed distance is expressed by a decreased distance from a reference value P cos β (=1.74 mm). The decreased distance is figured out by deducting a vertical distance between the roller and substrate measured during the rubbing process from the reference value.

TABLE 3

| | | Stretch rate of rubbing cloth (%) | | | | | |
| --- | --- | --- | --- | --- | --- | --- | --- |
| | | 1 | 1.2 | 3.3 | 5.8 | 11.7 | 17.5 |
| Depressed distance (mm) | 0.1 | Sample 1 | Sample 6 | Sample 11 | Sample 16 | Sample 21 | Sample 26 |
| | 0.3 | Sample 2 | Sample 7 | Sample 12 | Sample 17 | Sample 22 | Sample 27 |
| | 0.5 | Sample 3 | Sample 8 | Sample 13 | Sample 18 | Sample 23 | Sample 28 |
| | 0.7 | Sample 4 | | Sample 14 | Sample 19 | Sample 24 | Sample 29 |
| | 0.9 | Sample 5 | Sample 10 | Sample 15 | Sample 20 | Sample 25 | Sample 30 |

Figure 11:
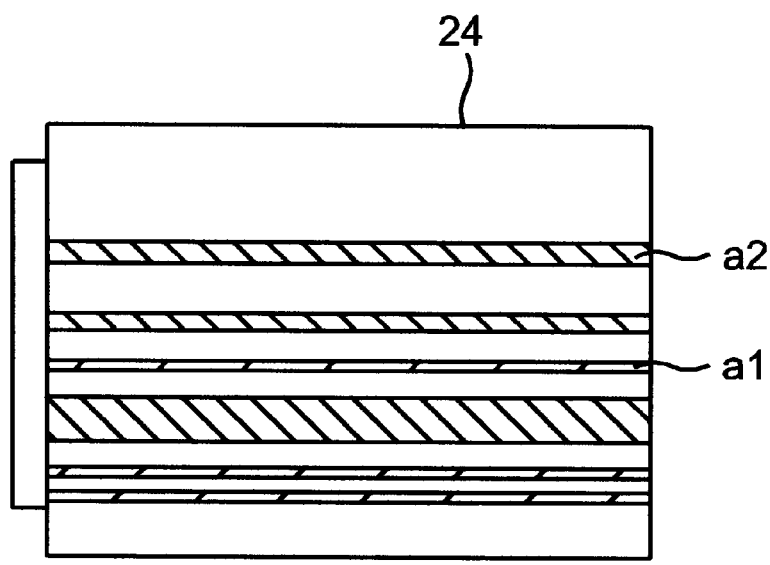
FIG. 11 shows striped mottles appearing on the LCD produced by a conventional rubbing method.

The samples receive an electric signal between the electrodes with a voltage over the threshold value of the liquid crystal, the resultant appearing mottles observed are shown in table 4. The mottles include striped mottles "a1" shown in FIG. 11, belt-like mottles "a2" shown also in FIG. 11, and equally spaced mottles shown in FIG. 12.

TABLE 4

| Sample No. | Striped mottles (FIG. 11 a1,) | Belt mottles (FIG. 11 a2,) | Even-spared mottles (FIG. 12) |
| --- | --- | --- | --- |
| 1 | Δ | Δ | ○ |
| 2 | Δ | Δ | ○ |
| 3 | Δ | Δ | ○ |
| 4 | Δ | Δ | ○ |
| 5 | Δ | Δ | ○ |
| 6 | Δ | Δ | ○ |
| 7 | ○ | ○ | ○ |
| 8 | ○ | ○ | ○ |
| 9 | ○ | ○ | ○ |
| 10 | Δ | Δ | × |
| 11 | Δ | Δ | ○ |
| 12 | ○ | ○ | ○ |
| 13 | ○ | ○ | ○ |
| 14 | ○ | ○ | ○ |
| 15 | Δ | Δ | × |
| 16 | Δ | Δ | ○ |
| 17 | ○ | ○ | ○ |
| 18 | ○ | ○ | ○ |
| 19 | ○ | ○ | ○ |
| 20 | Δ | Δ | × |
| 21 | Δ | Δ | × |
| 22 | ○ | ○ | × |
| 23 | ○ | ○ | × |
| 24 | ○ | ○ | × |
| 25 | Δ | Δ | × |
| 26 | Δ | Δ | × |
| 27 | ○ | ○ | × |

TABLE 4-continued

| Sample No. | Striped mottles (FIG. 11 a1,) | Belt mottles (FIG. 11 a2,) | Even-spared mottles (FIG. 12) |
|---|---|---|---|
| 28 | ○ | ○ | × |
| 29 | ○ | ○ | × |
| 30 | Δ | Δ | × |

Figure 15A:
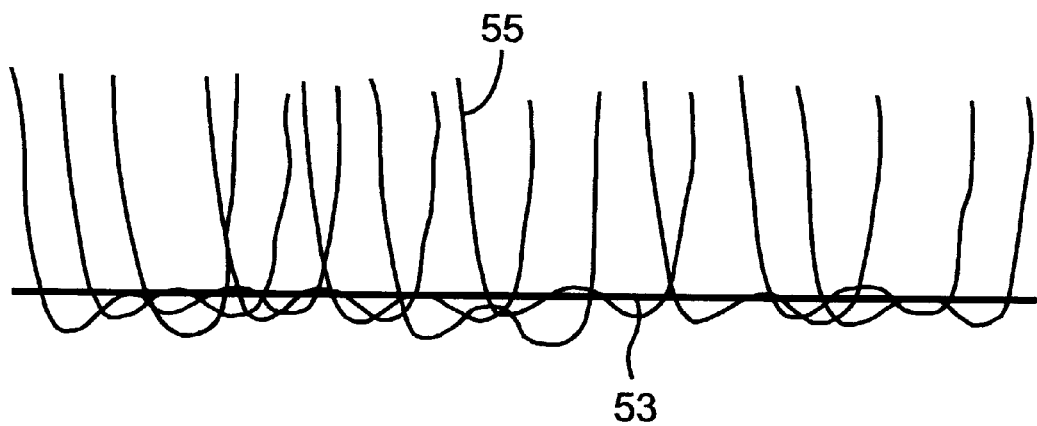
FIG. 15(a) is a cross section of a rubbing cloth used in a conventional orientation method.
Figure 15B:
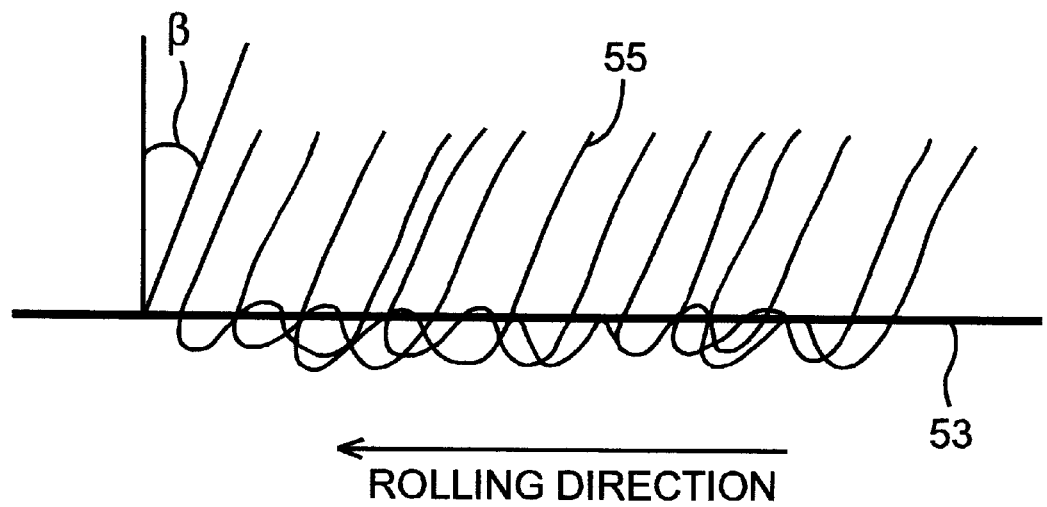
FIG. 15(b) is a cross section of a rubbing cloth used in the orientation method of the present invention.

The results shown in table 4 are graded in three ranks as follows:
×: mottles same as observed when a conventional rubbing cloth is used as shown in FIG. 15 (a) where the pile rising direction is vertical to the cloth,
Δ: mottles less than the foregoing level represented by ×, and
○: mottles substantially less than the foregoing level represented by ×.

(Exemplary Embodiment 2)

Table 5 lists 15 samples of which cut-out angles α (shown in FIG. 8) and depressed distances in rubbing are varied. Other processes except the tilt angle θ (shown in FIG. 9) that takes 35° in this exemplary embodiment are kept same as those in the first exemplary embodiment.

TABLE 5

| | | Stretch rate of rubbing cloth (%) | | | | |
|---|---|---|---|---|---|---|
| | | 1 | 1.2 | 3.3 | 11.7 | 17.5 |
| Depressed distance (mm) | 0.3 | Sample 31 | Sample 34 | Sample 37 | Sample 40 | Sample 43 |
| | 0.5 | Sample 32 | Sample 35 | Sample 38 | Sample 41 | Sample 44 |
| | 0.7 | Sample 33 | Sample 36 | Sample 39 | Sample 42 | Sample 45 |

The samples receive an electric signal between the electrodes with a voltage over the threshold value of the liquid crystal, the resultant appearing mottles observed are shown in table 6. The mottles include striped mottles "a1" shown in FIG. 11, belt-like mottles "a2" shown also in FIG. 11, and equally spaced mottles shown in FIG. 12. The results are graded with the same criteria as the first exemplary embodiment.

TABLE 6

| Sample No. | Striped mottles (FIG. 11 a1,) | Belt mottles (FIG. 11 a2,) | Even-spared mottles (FIG. 12) |
|---|---|---|---|
| 31 | Δ | Δ | ○ |
| 32 | Δ | Δ | ○ |
| 33 | Δ | Δ | ○ |
| 44 | ○ | ○ | ○ |
| 35 | ○ | ○ | ○ |
| 36 | ○ | ○ | ○ |
| 37 | ○ | ○ | ○ |
| 38 | ○ | ○ | ○ |
| 39 | ○ | ○ | ○ |
| 40 | ○ | ○ | ○ |
| 41 | ○ | ○ | ○ |
| 42 | ○ | ○ | ○ |
| 43 | ○ | ○ | ○ |
| 44 | ○ | ○ | ○ |
| 45 | ○ | ○ | ○ |

(Exemplary Embodiment 3)

The same cloth used in the forgoing measurement is cut out to two rectangles each having a less than a half length of the roller rim length. The two rectangular cloths are wrapped with equal spaces around the roller as a rubbing cloth by double-faced tape so that the longitudinal directions ("L" of FIG. 8) of the cloths are parallel with an end face of the roller. FIG. 10 illustrates a cross section of thus produced rubbing roller.

Table 7 lists 9 samples of which cut-out angles α (shown in FIG. 8) and depressed distances in rubbing are varied. Other processes except using the rubbing roller discussed above are kept same as those in the first exemplary embodiment.

TABLE 7

| | | Stretch rate of rubbing cloth (%) | | |
|---|---|---|---|---|
| | | 3.3 | 11.7 | 17.5 |
| Depressed distance (mm) | 0.3 | Sample 46 | Sample 49 | Sample 52 |
| | 0.5 | Sample 47 | Sample 50 | Sample 53 |
| | 0.7 | Sample 48 | Sample 51 | Sample 54 |

The samples receive an electric signal between the electrodes with a voltage over the threshold value of the liquid crystal, the resultant appearing mottles observed are shown in table 8. The mottles include striped mottles "a1" shown in FIG. 11, belt-like mottles "a2" shown also in FIG. 11, and equally spaced mottles shown in FIG. 12. The results are graded with the same criteria as the first exemplary embodiment.

TABLE 8

| Sample No. | Striped mottles (FIG. 11 a1,) | Belt mottles (FIG. 11 a2,) | Even-spared mottles (FIG. 12) |
|---|---|---|---|
| 46 | ○ | ○ | ○ |
| 47 | ○ | ○ | ○ |
| 48 | ○ | ○ | ○ |
| 49 | ○ | ○ | ○ |
| 50 | ○ | ○ | ○ |
| 51 | ○ | ○ | ○ |
| 52 | ○ | ○ | ○ |
| 53 | ○ | ○ | ○ |
| 54 | ○ | ○ | ○ |

In the previous exemplary embodiments, an STN (super twist nematic) type LCD are used; however, the same result can be obtained by a TN (twist nematic) type LCD and a lateral driving LCD.

In the previous exemplary embodiments, the panel vacuum-injected is employed; however, the same result can be obtained with any cell structures.

As discussed above, the orientation process of the present invention can eliminate the striped mottles appearing at half-tone display and at around the threshold voltage of the LCD, whereby quality display on the overall LCD can be realized.

What is claimed is:

1. A method of orientation process for a liquid crystal display (LCD), wherein orientation films formed on an upper and a lower substrate of the LCD undergo a process for rubbing the substrates in a diagonal direction with regard to a moving direction of the substrates with a cylindrical rubbing roller, wherein a rubbing member with short fibers thereon is wrapped around the rubbing roller, said method comprising:

(a) wrapping said rubbing member around the roller so that the axial directions of said fibers are inclined relative to a roller rolling direction;

(b) performing a first rubbing operation within a crossing angle produced by each normal orientation direction of said upper and lower substrates, and within an angle ranging from 5° to 30° with regard to the respective normal orientation directions; and (c) performing a second rubbing operation for determining an orientation direction after said first rubbing operation.

2. The method of orientation process of liquid crystal display as defined in claim 1, wherein an angle $\alpha$ that is produced by the roller rolling direction and the fibers axial direction of the cloth, a rotational speed N (rpm) of the roller, a moving speed S (mm/sec) of a stage and a width D (mm) of an ITO electrode satisfy a relation of $D<(60\times S/N)\tan\alpha$.

3. The method of orientation process of liquid crystal display as defined in claim 1, wherein one of said upper and lower substrates is a color filter substrate.

4. The method of orientation process of liquid crystal display as defined in claim 1, wherein a tensile stress of 1 kg/cm is applied to said rubbing buff in the roller rolling direction to effect a stretch rate of not more than 10%.

5. The method of orientation process of liquid crystal display as defined in claim 1, wherein "n" sheets of rubbing cloths of which each length in the roller rolling direction is not more than 1/n (n takes one of a natural numbers including 2 and more) of a roller rim length are wrapped around the roller with equal spaces.

6. The method of orientation process of liquid crystal display as defined in claim 1, wherein the rubbing steps described in (b) and (c) are performed under a condition where a minimum distance between a pile root and a surface of the orientation film is less than $P\cos\beta$ by 0.2–0.7 mm, where P (mm) represents a length of the pile and $\beta$ (°) represents a tilt angle of the pile, wherein the tilt angle $\beta$ is produced by the pile and a normal line with regard to an outer face of the roller that passes over a root of the pile.

7. The method of orientation process of liquid crystal display as defined in claim 1, wherein the rubbing process is provided repeatedly to each substrate in the same direction.

8. A liquid crystal display formed by the orientation method as defined in claim 1.

9. The liquid crystal display as defined in claim 8, wherein an anisotropy of dielectric constant is not more than 7, a phase transition temperature between an isotropic phase and a liquid crystal phase is not less than 90° C. and mixed liquid crystal material unified into one of an alkyl system liquid crystal composition and an alkenyl system liquid crystal composition.

* * * * *